United States Patent [19]
Peters et al.

[11] Patent Number: 6,049,598
[45] Date of Patent: Apr. 11, 2000

[54] FACILITY FOR TYING A DOOR INTERCOMMUNICATION SYSTEM WITH A VIDEO CAMERA TO AN INTEGRATED SERVICES DIGITAL NETWORK

[75] Inventors: Wolfgang Peters, Tamm; Gerhard Schneider, Leonberg, both of Germany

[73] Assignee: Alcatel, Paris, France

[21] Appl. No.: 08/919,833

[22] Filed: Aug. 28, 1997

Related U.S. Application Data

[63] Continuation-in-part of application No. 08/627,105, Apr. 3, 1996, Pat. No. 5,717,379.

[30] Foreign Application Priority Data

Aug. 28, 1996 [DE] Germany ............ 196 34 778

[51] Int. Cl.[7] ............................................. H04M 11/00
[52] U.S. Cl. .................. 379/102.06; 348/14; 379/167
[58] Field of Search ...................... 379/90.01, 93.17, 379/102.06, 167, 53, 54; 348/14, 15, 16, 143, 156, 159, 152, 161; 340/825.31, 825.34

[56] References Cited

U.S. PATENT DOCUMENTS

| | | | |
|---|---|---|---|
| 5,369,685 | 11/1994 | Kero | 379/88.03 |
| 5,440,624 | 8/1995 | Schoof, II | 379/202 |
| 5,541,982 | 7/1996 | Bergler | 379/93 |
| 5,717,379 | 2/1998 | Peters | 379/38 |

FOREIGN PATENT DOCUMENTS

| | | |
|---|---|---|
| 0505913 | 9/1992 | European Pat. Off. . |
| 4127316 | 6/1992 | Germany . |
| 4203388 | 8/1993 | Germany . |
| 4229151 | 3/1994 | Germany . |
| 19506673 | 9/1996 | Germany . |
| 19512959 | 10/1996 | Germany . |
| 2285365 | 7/1995 | United Kingdom . |

*Primary Examiner*—Curtis A. Kuntz
*Assistant Examiner*—Melur Ramakrishnaiah
*Attorney, Agent, or Firm*—Ware, Fressola, Van Der Sluys & Adolphson LLP

[57] ABSTRACT

A telephone system with a video camera is connected to an integrated services digital network (ISDN) via a facility (EIN). To that end, the facility (EIN), for example, comprises an audio unit (AUD1) for coupling the audio signals from the door intercommunication system to the digital network (ISDN), a video unit (VID1) for coupling the video signals from the video camera to the digital network (ISDN), a control unit (CTRL) for transmitting a request signal to establish a switched connection for transmitting the video and audio signals via the digital network (ISDN) in case of an activation of the door intercommunication system, and to receive control signals and transmit the control signals without breaking the switched connection to at least one remotely controllable unit (UNIT) and to an ISDN video telephone with programmed call forwarding. From his ISDN video telephone the occupant of an apartment is able to identify a visitor to his apartment through a video image and to activate the door opener by means of control signals without breaking the switched connection, and switch over to a second video camera and a second intercom station inside the apartment, and in this way check on the visitor even after he has entered the apartment, or communicate with him via the ISDN video telephone.

11 Claims, 3 Drawing Sheets

FACILITY FOR TYING A DOOR INTERCOMMUNICATION SYSTEM WITH A VIDEO CAMERA TO AN INTEGRATED SERVICES DIGITAL NETWORK

This application is a continuation-in-part of co-pending application Ser. No. 08/627,105, filed Apr. 3, 1996, now U.S. Pat. No. 5,717,379, granted Feb. 10, 1998.

BACKGROUND OF THE INVENTION

1. Technical Field

The invention concerns a facility for tying a door intercommunication system with a video camera to an integrated services digital network.

2. Discussion of Related Art

A method for automatically establishing a telephone connection from a door intercom station via a telephone set or a telephone installation is known from DE 4127316. To that end an activating switch is connected to a name key of the telephone set and to the door bell contact of the door intercom station. When a visitor activates the door bell contact, a telephone connection is automatically established to the number preprogrammed on the name key, e.g., the number of the office in which the occupant of the apartment works during the day. After the telephone connection is cleared, the door opener is activated by transmitting an audio frequency signal from the dialed call number. Due to the telephone link, the communication between the visitor and the occupant of the apartment is limited to verbal statements and identification. After the door opener has been activated no further verification by the occupant of the apartment is possible, e.g., whether the door was closed after the completion or the proper execution of an assignment, for example if the visitor is a mailman who wants to deliver a package to the apartment.

SUMMARY OF INVENTION

It is therefore the task of the invention to provide an occupant of the apartment with a technically improved possibility of telemetrically identifying a visitor to the apartment.

According to the present invention, a facility for tying a door intercommunication system with a video camera to an integrated services digital network comprises an audio unit for coupling audio signals of the door intercommunication system to the digital network, a video unit for coupling video signals of the video camera to the digital network, and a control unit for transmitting a request signal for establishment of a switched connection for transmitting the video and audio signals over the digital network in the event of an operation of the door intercommunication system as well as for receiving control signals and for transmitting the control signals to at least one remotely controllable unit without breaking the switched connection.

A special advantage of the invention is that a new service feature is generated for video telephones, which promotes the functionality and the use of video telephones as well as their sale. Another advantage of the invention is that only minor changes of the existing installations are required, for example in the door intercommunication system or the video telephone, to tie the door intercommunication system with a video camera to an integrated services digital network.

These and other objects, features and advantages of the present invention will become more apparent in light of the detailed description of a best mode embodiment thereof, as illustrated in the accompanying drawing.

DETAILED DESCRIPTION OF PREFERRED EMBODIMENTS

Figure 1:
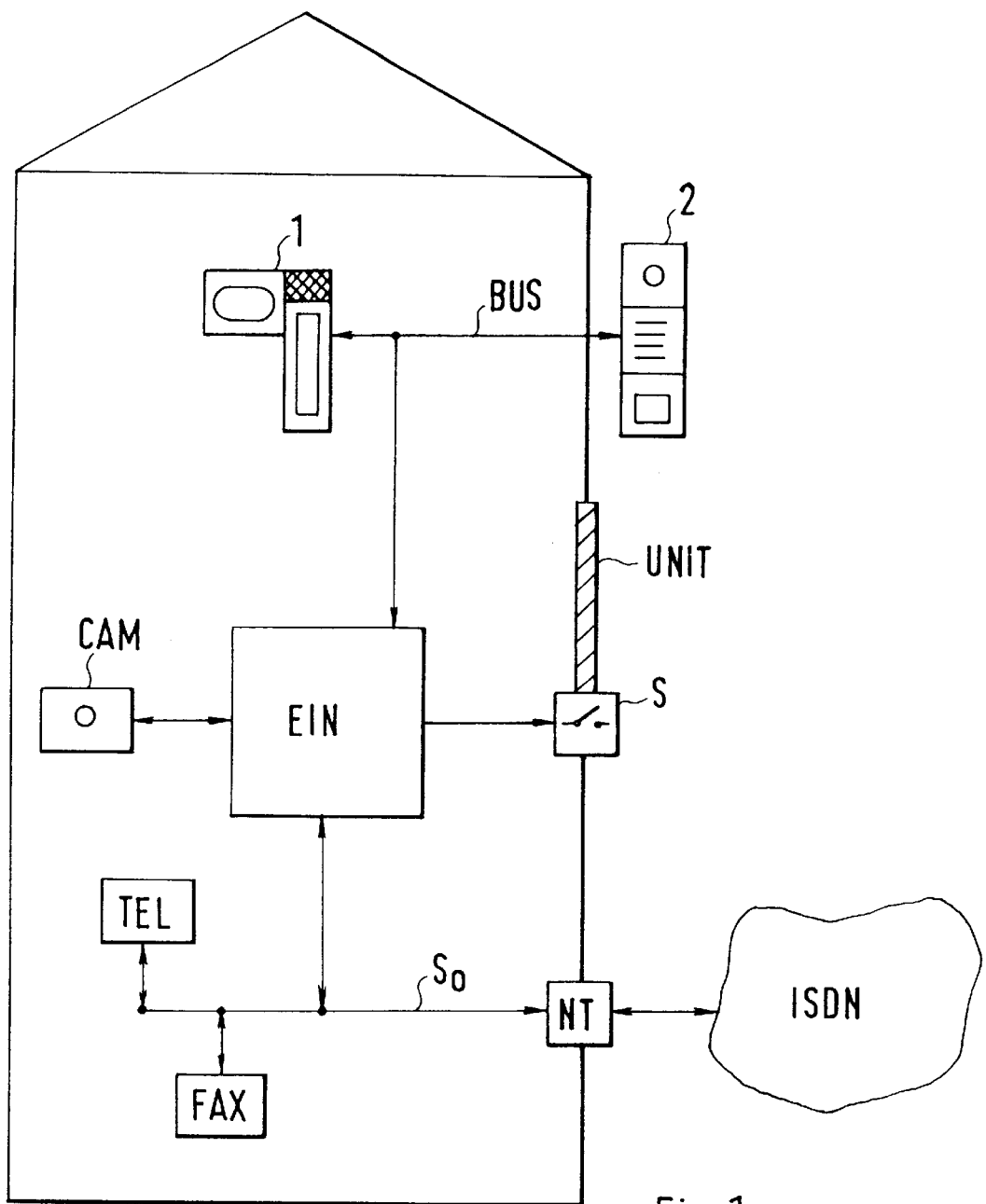
FIG. 1 is a schematic illustration of the use of a facility according to the invention for tying a door intercommunication system with a video camera to an integrated services digital network.

The configuration example is explained first by means of FIG. 1 illustrating a facility EIN according to the invention which is connected to a door intercommunication system with a video camera and in integrated services digital network, the so-called ISDN.

The door intercommunication system comprises a unit 1 located on the inside of an apartment, a unit 2 located on the outside of an apartment, and an internal bus BUS for connecting the units 1 and 2.

Unit 1 comprises a screen and a telephone receiver as well as a control unit and a door bell. Unit 2 comprises a video camera, a loudspeaker installation as well as a door bell contact and a control unit.

When a visitor activates the door bell contact, a signal is transmitted to the door bell via the internal bus BUS. When the telephone receiver is lifted, the screen, the video camera and the loudspeaker installation are activated by control units so that the video image of the visitor appears on the screen and the person on the telephone receiver is able to communicate with the visitor.

The internal bus BUS is additionally connected to the facility EIN to tie the door intercommunication system with a video camera to the integrated services digital network. If the telephone receiver is not lifted when the door bell contact is activated, e.g., after a period of time programmed in the facility EIN, a switched connection is established via the integrated services digital network, which is triggered, e.g., by a signal generated in the control unit 1 and transmitted via the internal bus BUS to the unit EIN, as well as by a call number previously programmed in the facility EIN.

To that end, the facility EIN is connected to the ISDN via an $S_0$-bus $S_0$ and a network termination unit NT. The $S_0$-bus $S_0$ furthermore connects an ISDN telephone TEL and a fax machine FAX, for example. The network termination unit NT is designed for transmitting two user information channels and one signaling channel, for example. The user information channels are the so-called B-channels with 64 kbit/s of transmission capacity each. The signaling channel is the so-called D channel with 16 kbit/s of transmission capacity. Thus the configuration of the network termination unit NT corresponds to the basic connection configuration in the ISDN.

The facility EIN is furthermore connected with a video camera CAM and a controller S for a remotely controllable unit UNIT. The remotely controllable unit UNIT, for example, is a door opener, a roller shutter, a garage door or a video camera.

When the bell contact of the door intercommunication system is activated and the telephone receiver is not lifted, the facility EIN establishes a switched connection to a video telephone whose call number was previously programmed by the occupant of the apartment, for example, to the video telephone in the office where the occupant of the apartment works during the day. When the receiver of the video telephone is lifted, the control unit of unit 2 activates the video camera and the loudspeaker installation, whereupon the image of the visitor becomes visible on the screen of the video telephone in the occupant's office and the person at the video telephone, as a rule the occupant of the apartment himself, is able to communicate with the visitor. After identifying the visitor by means of the video image, the occupant of the apartment can, e.g., activate the door opener with a control signal transmitted in the signaling channel of the ISDN without breaking the switched connection, so that the visitor can enter the apartment if this is desirable. The visitor can, for example, be the child of the occupant of the apartment who does not yet have his own apartment key and is returning from school while the occupant of the apartment is still in the office. Or the visitor is, for example, a mailman carrying a package to be delivered to the apartment.

The switched connection remains intact to monitor whether the control of the remotely controllable unit UNIT has taken place as desired. The video camera of the door intercommunication system is also remotely controllable, for example, so that the occupant of the apartment is able to center the visitor's image during the video communication. In addition, and by means of a further control signal transmitted in the signaling channel, the facility EIN can switch from the video camera of the door intercommunication system to the video camera CAM without breaking the switched connection. The video camera CAM is located in the apartment, which enables the occupant of the apartment to observe the visitor on the video telephone in his office, even after the visitor has entered the apartment; for example, the mailman regarding to whether he has closed the apartment door after delivering the package and has not removed anything. The switched connection is terminated by hanging up the receiver of the video telephone.

Figure 2:
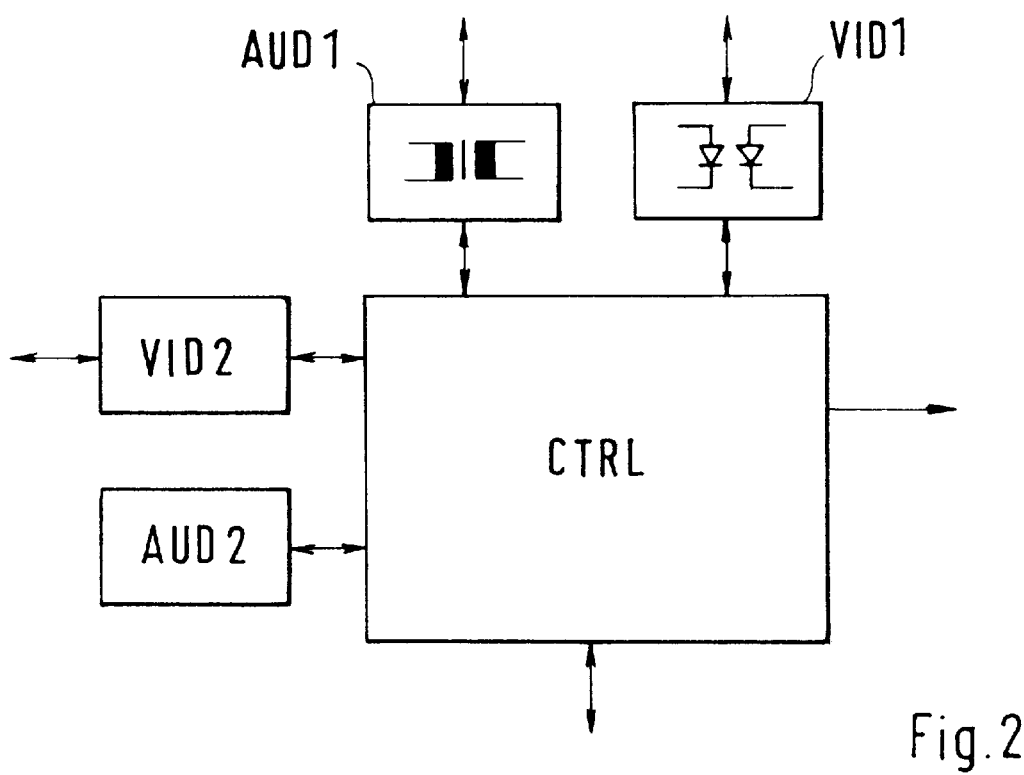
FIG. 2 is a schematically illustrated construction of the facility of the invention in FIG. 1.

The configuration example will now be explained further by means of FIG. 2. FIG. 2 schematically illustrates a construction of the facility EIN of the invention in FIG. 1. The facility EIN comprises an audio unit AUD1 for coupling the audio signals of the loudspeaker installation in the door intercommunication system to the ISDN, a video unit VID1 for coupling the video signals of the video camera in the door intercommunication system to the ISDN, and a control unit CTRL for transmitting a request signal to establish a switched connection for transmitting the video and audio signals via the ISDN in case the door intercommunication system has been activated. The control unit CTRL is furthermore used to receive control signals and to transmit the control signals to at least one remotely controllable unit UNIT without breaking the switched connection.

The coupling of the audio and video signals to the ISDN, and the coupling of the audio signals from the ISDN to the internal bus BUS cannot be achieved directly due to the different protocols and potentials. For that reason the audio unit AUDI comprises two transformers for separating the potential and a converter unit for converting the protocol. The video unit VID1 comprises an optocoupler for separating the potentials and a converter unit for converting the protocols. The optocoupler is designed to transmit high bit rates and is therefore especially suited for transmitting video signals which have a higher bit rate than the audio signals.

Figure 3:
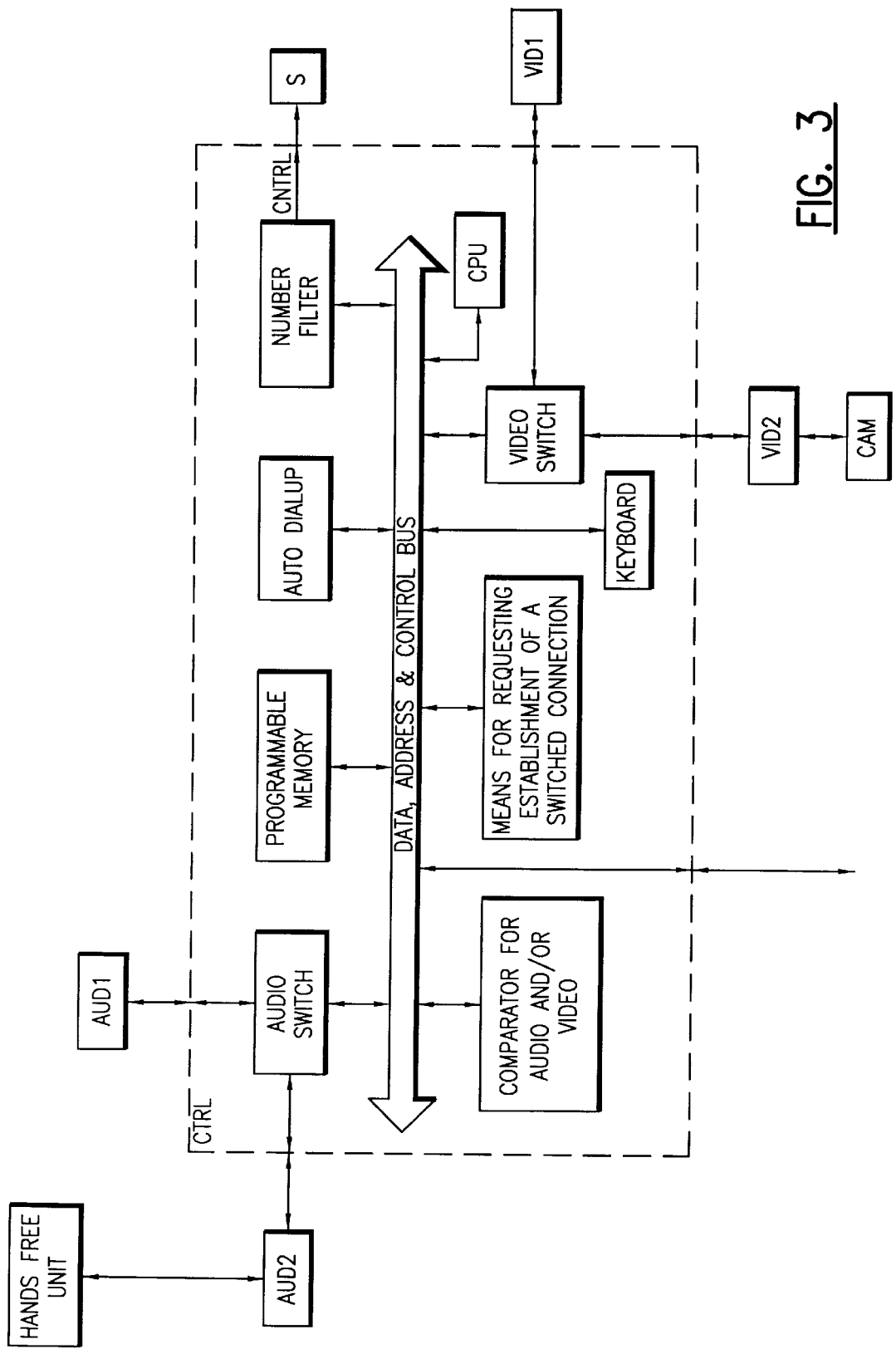
FIG. 3 is a simplified block diagram of an embodiment of the control unit of FIG. 2.

As shown in FIG. 3, the control unit CTRL comprises a memory for storing video images and a comparator for comparing the stored video images with the video signals from the video camera, as well as an ISDN video telephone or a computer with an ISDN-PC adapter card. For example, individual video images of persons known to the occupant of the apartment can be stored in the memory. This takes place, for example, when the respective person activates the door intercommunication system during a programming phase, and the video image taken by the video camera is stored in the memory. The programming phase can be adjusted in the control unit CTRL. To that end, the control unit CTRL comprises, for example, a microprocessor or a digital signal processor and a keyboard, whereby a programming code must be entered. In that way, the video image of the child of the occupant of the apartment, or of one or several neighbors or of the mailman, can be stored, for example. If a visitor now activates the door intercommunication system, the actual video image of the visitor is first compared with the stored video images before the switched connection is established. Depending on the programming by the occupant of the apartment, a request signal for establishing a switched connection is only transmitted, for example, to the ISDN video telephone or to the computer if the actual video image of the visitor corresponds to a stored video image, i.e. identifies the visitor. Thus, the ISDN video telephone or the computer, for example, only establish as a switched connection to a previously-programmed call number when the child of the occupant of the apartment or a neighbor activates the door intercommunication system. No switched connection is established if a person who is not known to the occupant of the apartment activates the door intercommunication system, e.g., an agent.

Audio signals can also be stored and compared instead of, or in addition to, comparing the visitor's video image with the stored video images. To that end, the control unit CTRL comprises a memory for storing audio signals and a comparator for comparing the stored audio signals with the audio signals from the door intercommunication system. A request signal for establishing a switched connection is only transmitted depending on the result of the comparison with the ISDN video telephone or the computer. For example, if the child of the occupant of the apartment activates the door intercommunication system, the child can establish a switched connection by speaking his or her name, if that name was previously stored in the memory during a programming phase and the control unit identifies the child.

In addition, the facility EIN comprises a second video unit VID2 for connection to a second video camera CAM. The second video camera CAM is located inside of the occupant's apartment and is used to monitor the inside of the apartment, and particularly the apartment door. The second video camera CAM is activated by the control unit CTRL and via the video unit VID2 and is also remotely controllable. When the occupant of the apartment has activated the door opener by sending a control signal through the signaling channel, he is able to switch over to the second video camera CAM by means of a further control signal from the video camera of the door intercommunication system, for example, to monitor whether the door was opened. To that end, the control unit CTRL comprises a switch for switching from transmission of the video signals from the first video camera of the door intercommunication system to transmission of the video signals from the second video camera CAM without breaking the switched connection. The switch can also be designed to switch back to the first video camera when the second control signal is transmitted again, so that it is possible to switch repeatedly between the two cameras. Like the video unit VID1, the video unit VID2 comprises an optocoupler and a protocol converter.

The facility EIN furthermore comprises a second audio unit AUD2 for connecting to a not-illustrated second intercom station, and a switch for switching from transmission of the audio signals from the station of the door intercommunication system to transmission of the audio signals from the second intercom station without breaking the switched connection. The construction of the second audio unit AUD2 is comparable to the construction of the audio unit AUD1, the construction of the switch is comparable to that of the video cameras switch. Instead of monitoring the internal area of the apartment by means of the second video camera, or in addition to this monitoring, the occupant of the apartment can continue the conversation he began with the visitor via the second intercom station in the apartment, by sending a control signal through the signaling channel to activate the switch. The audio and video signals of the door intercommunication system can also be rerouted to the ISDN video telephone by means of control signals from the occupant of the apartment, so that after entering the apartment the visitor, e.g., the child, is able to communicate with the occupant of the apartment via the ISDN video telephone. The control signals must previously be programmed and stored in the microprocessor or in the digital signal processor. Possible control signals are, for example, the numbers on the keyboard of the ISDN video telephone. An example of the allocation could be: number 1 activates the door opener, number 2 switches from video camera 1 to 2 and vice versa, number 3 switches from the intercom station 1 to 2 and vice versa, number 4 switches form the door intercommunication system to the ISDN video telephone.

The control unit CTRL additionally comprises a programmable memory for the programmable storing of at least one call number, which is automatically dialed when the door intercommunication system is activated. The call number is entered into the ISDN video telephone as call forwarding, for example. The call number can either be entered into the ISDN video telephone itself, or telemetrically via a switched connection and control signals in the signaling channel; for example, the keyboard number 5 of the telephone being used serves to transfer the programming of the call number, which is subsequently entered via the keyboard. The programming is ended by entering the number sequence 000, for example. However, to program the call number for call forwarding, the ISDN video telephone can only be called from telephones with previously specified call numbers. To that end, the control unit CTRL comprises a call number filter in which the desired call numbers have previously been programmed. The call number filter only allows to recall video and/or audio signals via switched connections that are established through the previously specified call numbers, to direct control signals to the at least one remotely controllable unit EIN, and/or to program the call number for call forwarding. In this way, the occupant of the apartment can call his own ISDN video telephone, e.g., for the purpose of monitoring, without the door intercommunication system having been activated by a visitor, and via the facility EIN to view the video signals from the door intercommunication system or from the second video camera, and/or to recall the audio signals from the door intercommunication system or from the second intercom station. He is also able to operate the remotely controllable units, e.g., the roller shutters, to simulate his presence when he is away on vacation, for example.

According to the above, the video and audio signals can be transmitted in this manner from the facility EIN to an ISDN telephone whose call number was previously programmed in the facility EIN either as call forwarding and/or in the call number filter, and to receive video and audio signals from the facility EIN. The transmission of video and audio signals takes place in at least one user information channel, preferably in two B-channels of the ISDN. In addition, persons are able to transmit a switched connection from authorized call numbers to the facility EIN for control signals in a signaling channel. The facility EIN can furthermore be programmed with the microprocessor so that the occupant of the apartment is able to store the video image of the visitor and/or his conversation with the visitor in a memory of the facility EIN, for example, by pressing the number 6, 7 or 8 on the keyboard of the authorized telephone being used; e.g., number 6 for video, number 7 for audio and number 8 for video and audio. As an alternative, or in addition thereto, the microprocessor can also be programmed so that if an attempt to establish a switched connection to the programmed call number fails, e.g., if the receiver is not lifted due to the temporary absence of the occupant from the apartment, the facility EIN receives and stores video and audio signals under the programmed call number for a specified period of time, 30 seconds, for example, providing the occupant of the apartment with the opportunity to verify whether his door system was activated during his absence. The recall of the stored signals by the occupant of the apartment can take place similarly to a telephone answering machine, e.g., in the ISDN video telephone itself after he returns to his apartment, or by remote scanning via a switched connection and, for example, using the number 9 on the keyboard of the respective telephone.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A facility (EIN) for tying a door intercommunication system with a video camera to an integrated services digital network (ISDN), said facility (EIN) comprising
   an audio unit (AUD1) for coupling audio signals of the door intercommunication system to the digital network (ISDN),
   a video unit (VID1) for coupling video signals of the video camera to the digital network (ISDN), and
   a control unit (CTRL) for transmitting a request signal for establishment of a switched connection for transmitting the video and audio signals over the digital network (ISDN) in the event of an operation of the door intercommunication system as well as for receiving control signals and for transmitting the control signals to at least one remotely controllable unit (UNIT) without breaking the switched connection.

2. A facility (EIN) as claimed in claim 1, characterized in that the audio unit (AUD1) contains two transformers, and that the video unit (VID1) contains an optocoupler.

3. A facility (EIN) as claimed in claim 1, characterized in that the control unit (CTRL) comprises a memory for storing video images and a comparator for comparing stored video images with the video signals from the video camera, and that a request signal is only transmittable depending on the result of the comparison.

4. A facility (EIN) as claimed in claim 1, characterized in that it comprises a second video unit (VID2) for connection to a second video camera (CAM) and a switch for switching from transmission of the video signals from the first video camera to transmission of the video signals from the second video camera (CAM) without breaking the switched connection.

5. A facility (EIN) as claimed in claim 1, characterized in that it comprises a second audio unit (AUD2) for connection to a hands-free unit and a switch for switching from transmission of the audio signals from the door intercommunication system to transmission of the audio signals from the hands-free unit without breaking the switched connection.

6. A facility (EIN) as claimed in claim 1, characterized in that the control unit (CTRL) comprises a programmable memory for storing at least one directory number which can be automatically dialed in the event of an operation of the door intercommunication system.

7. A facility (EIN) as claimed in claim 6, characterized in that the control unit (CTRL) comprises a number filter which authorizes only predetermined directory numbers to retrieve video and/or audio signals over a switched connection, to pass control signals on to the at least one remotely controllable unit (UNIT), and/or to program a number for call forwarding.

8. A facility (EIN) as claimed in claim 6, characterized in that over the switched connection, the video and audio signals are transmitted and received in at least one user information channel and the control signals are received in a signaling channel.

9. A facility (EIN) as claimed in claim 1, characterized in that the control unit (CTRL) comprises
a memory for storing audio signals and
a comparator for comparing the stored audio signals with the signals from the door intercommunication system for purposes of identifying a person speaking at the door, and that
a request signal is only transmittable if the result of the comparison identifies the person speaking.

10. A facility (EIN) as claimed in claim 1, characterized in that it comprises an ISDN video telephone or a computer with an ISDN-PC adapter card for establishing the switched connection.

11. A facility (EIN) as claimed in claim 1, characterized in that the control unit (CTRL) comprises a memory for storing the video and/or audio signals of the door intercommunication system.

* * * * *